Nov. 22, 1949 M. WATTER 2,488,785
ELECTRIC SHUNTING MEANS FOR RAILWAY RUNNING GEARS
Filed June 11, 1947 2 Sheets-Sheet 1

INVENTOR
Michael Watter
BY
ATTORNEY

Nov. 22, 1949 — M. WATTER — 2,488,785
ELECTRIC SHUNTING MEANS FOR RAILWAY RUNNING GEARS
Filed June 11, 1947 — 2 Sheets-Sheet 2
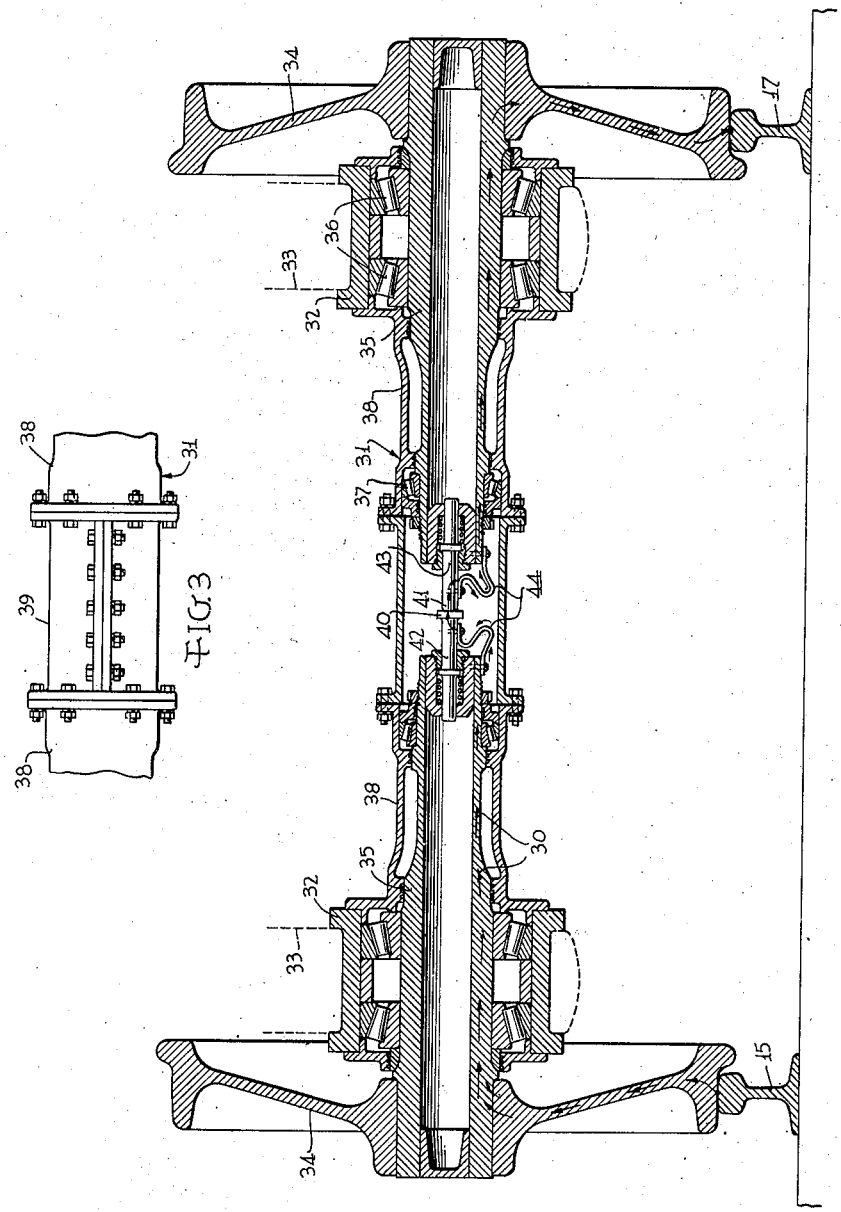
INVENTOR
Michael Watter
BY Maurice A. Crews
ATTORNEY Patented Nov. 22, 1949

2,488,785

UNITED STATES PATENT OFFICE 2,488,785

ELECTRIC SHUNTING MEANS FOR RAILWAY RUNNING GEAR

Michael Watter, Philadelphia, Pa., assignor to The Budd Company, Philadelphia, Pa., a corporation of Pennsylvania Application June 11, 1947, Serial No. 753,869

7 Claims. (Cl. 246—34)

1

The invention relates to railway running gear and particularly to such a gear in which a pair of wheels on the spaced tracks rotate differentially.

Such differential rotation of the wheels is desirable to avoid sliding of the wheels on the tracks, particularly in rounding curved sections of track, but difficulty has been experienced in the use of such differentially rotating wheels in obtaining good electrical connections between the opposite wheels and the rails with which they are associated to insure operation of track signals.

It is an object of the invention to avoid these difficulties and provide a relatively simple arrangement of electrical contacts associated with the differentially rotating wheels which insures operation of the track signals with a minimum of wear of the contacts.

Other and further objects and advantages and the manner in which they are attained will become evident from the following detailed description when read in connection with the drawings forming a part of this specification.

In the drawing,

Figure 2 is a similar view of a modification; and

Figure 3 is a fragmentary elevational view of the central portion of the axle housing of Figure 2.

Figure 1:
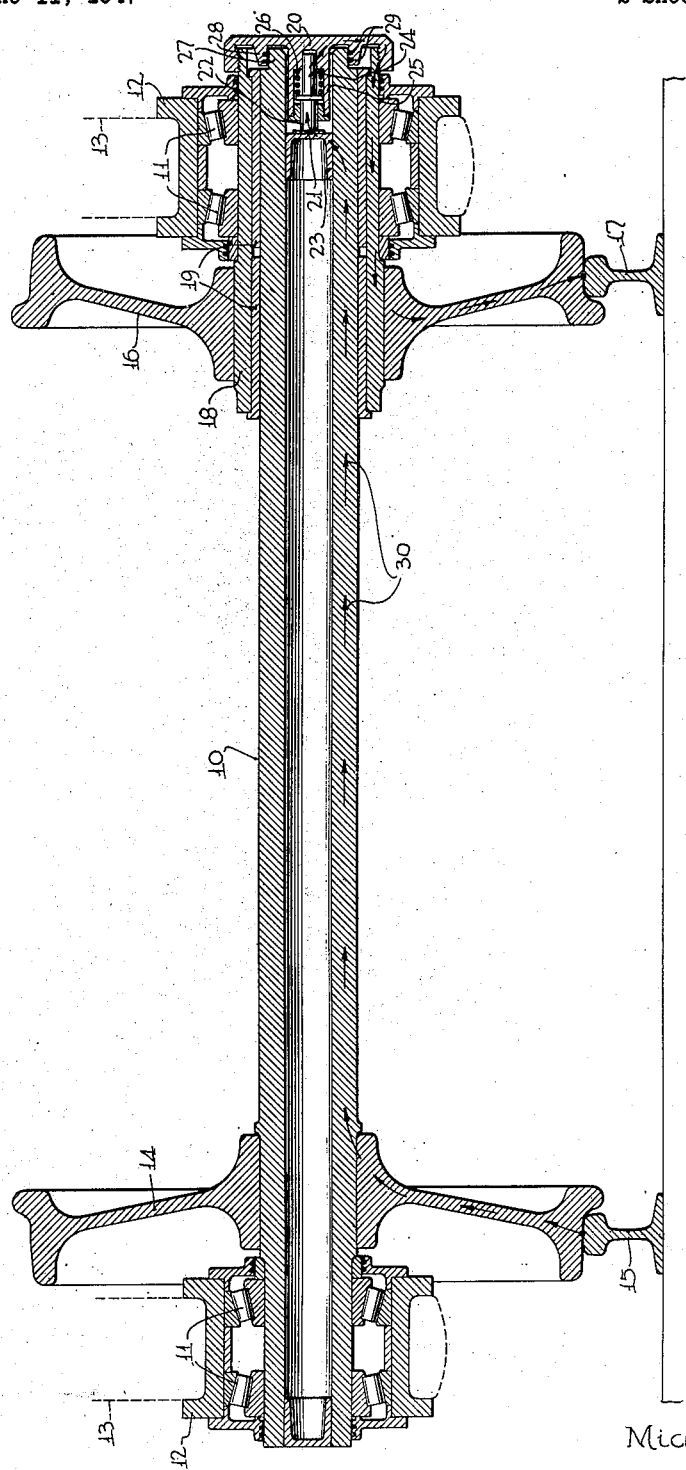
Figure 1 shows a railway running gear in transverse vertical section through the axle and associated wheels, this view showing one embodiment of the invention.

In the embodiment of the invention as shown in Figure 1, a hollow axle 10 is employed, this axle extending from side to side of the vehicle and being mounted through a usual form of roller bearing 11 in journal boxes 12 adjacent the ends of the axle, these journal boxes being mounted in a usual manner in the truck side frames 13.

One wheel 14 rolling on the left-hand rail 15 of the track is rigidly secured to the axle in a usual manner, as by press-fitting. The other wheel 16 rolling on right-hand rail 17 is press-fitted onto a sleeve 18 which is rotatably mounted on the adjacent end of the axle and extends outwardly through the adjacent journal box 12 to the end of the axle. Suitable anti-friction bearing sleeves 19 are interposed between the sleeve 18 and the axle 10. The outboard end of the sleeve 18 is screw-threaded to receive a closure cap 20 threaded thereon.

This cap and the hollow end of the axle provide a convenient chamber for housing electrical contacts which are provided to complete the

2 electrical circuit between the wheels 14 and 16 and the associated rails 15 and 17.

Such contacts are designated 21 and 22, one contact, as 21, being electrically connected concentrically with the axle 10 to a cup-shaped abutment 23 fitting within the hollow of the axle and secured thereto, as by welding or brazing or the like, to provide a good electrical connection. The contact 21 is shown as a plate separate from the abutment 23 for ease of replacement, but it might, obviously, be an integral part thereof. The opposing contact 22 is shown carried by a plunger 24 mounted for axial sliding movement in a central boss 25 on the cap 20 projecting into the hollow axle. The plunger is pressed by a coil spring 26 into firm engagement with the opposed contact 21 to complete the circuit at this point and this irrespective of relative rotation of the wheels 14 and 16. Since the contact engagement is an abutting engagement concentric with the axle, the contacts will be subjected to a minimum of wear due to the relative rotation of the wheels. Such relative rotation will only occur at intervals, such as when rounding curves, or due to differential braking of the wheels. Consequently, the wear on the contacts as arranged is reduced to a minimum.

In order to prevent oil from the bearing from reaching the contacts, an oil seal is preferably provided between the closure cap 20 and a reduced end portion 27 of the axle. This is accomplished by having an annular flange 28 on the cap telescope the reduced end portion 27 and providing oil seal rings 29 between these telescoping parts.

With this arrangement of parts, the wheels rolling on the opposed rails of the track are differentially rotatable, but such rotation does not interfere with good electrical circuit transmission between the rails. The arrows 30 in the view show a continuous good conductive path for the track circuits from rail to rail.

According to the form of the invention shown in Figures 2 and 3, a light stationary axle or axle housing, designated generally by 31, interconnects the journal boxes 32 at the opposite sides of the vehicle, these boxes being in this case disposed inboard of the wheels and suitably mounted in the inboard side frames of a truck, shown in dotted lines and designated 33. Each wheel 34 is press-fitted onto the ends of a stub axle 35 which is mounted in the adjacent journal box 32 through a usual large-diameter anti-friction bearing 36 and adjacent its inner end the stub axle is mounted through a smaller diameter anti-friction bearing 37 in the stationary axle or axle housing 31.

The stationary axle is preferably in three sections, two end sections 38 and an intermediate section 39 interconnecting the end sections. The inboard ends of the stub axles for the opposed wheels are spaced apart, but each extends inwardly some distance beyond its associated end section 38 of the stationary axle. The electrical contacts for completing the electrical connection between the wheels 34 are preferably disposed in a chamber or casing formed between the inner ends of the end sections 38 of the stationary axle and enclosed peripherally by the intermediate section 39. For ready access to the contacts, this intermediate section, which is bolted to the end section, is formed of two semi-cylindrical halves bolted together in their margins, see Figure 3.

The abutting electrical contacts 40 and 41 are carried coaxially with the axis of the stub axles, one contact being carried by a spring-pressed plunger, as 42, carried by the left-hand stub axle and the other by a similar plunger, as 43, carried by the right-hand stub axle. It will be understood, however, that instead of having both plungers spring-pressed and movable, one might, as in the first-described form, be fixed and only the other movably pressed against it. To insure a good electrical connection between each plunger and the adjacent axle, flexible conductors, as 44, may have their ends attached, as by screws, to the plunger and adjacent stub axle, respectively. It will be understood that a similar connection may also be provided between the plunger 25 and the end cap 20 in the form shown in Figure 1.

In Figure 2, as in Figure 1, the arrows 30 show the continuous good conductive path for the electric current in the track circuits from rail 15 to rail 17 at the opposite side of the vehicle. The contacts in this form, as in the form of Figure 1, being arranged concentric to the respective independently rotatable stub axles 35, are also subjected to a minimum of wear and, consequently, have a long life.

In this form of Figures 2 and 3, ready access is had to the contacts by merely removing one-half of the intermediate section 39 of the stationary axle. In the form of Figure 1, such access is also readily had by unscrewing the closure cap 20.

While several specific embodiments of the invention has been herein described in detail, it will be understood that changes and modifications may be made by those skilled in the art without departing from the main features of the invention, and such changes and modifications are intended to be covered by the appended claims.

What is claimed is:

1. In a railway running gear, a pair of wheels rotating on a common axis and running on the rails of a track, said wheels being mounted to rotate differentially, and electrical contacts, one electrically connected through an unbroken metallic connection to one of the wheels and the other electrically connected through a similar connection to the other of the wheels and normally pressed into engagement with each other to complete an electrical circuit from one to the other, said contacts having abutting engagement with each other on the axis of the wheels, and completing an electrical circuit from rail to rail at all times irrespective of the differential rotation of the wheels.

2. In a railway running gear, a pair of wheels each fixedly mounted on an axle section, the wheels and their associated axle sections being mounted to rotate with respect to each other on a common axis, and a pair of electrical contacts, one mounted concentrically with, and in unbroken electrical connection to, one axle section and the other concentrically with, and in unbroken electrical connection to, the other axle section, said contacts being biased into abutting engagement and completing an electrical circuit from wheel to wheel irrespective of the relative rotation of said wheels and their associated axle sections.

3. In a railway running gear, a pair of wheels each fixedly mounted on an axle section, the wheels and their associated axle sections being mounted to rotate with respect to each other on a common axis, a closed housing formed, at least in part, by said axle sections, and a pair of electrical contacts in said closed housing, one mounted concentrically with one axle section and having an unbroken electrical connection therewith and the other similarly mounted on and electrically connected with the other axle section, said contacts being biased into abutting engagement with each other and completing an electrical circuit from wheel to wheel irrespective of the relative rotation of said wheels and their associated axle sections.

4. In a railway running gear, a pair of wheels each fixedly associated with a stub axle mounted through anti-friction bearings in a vehicle frame, said stub axles and their associated wheels being mounted to rotate with respect to each other on a common axis, the inner ends of said stub axles carrying concentrically therewith a pair of electrical contacts, one electrically connected to each stub axle and means for biasing the pair of contacts into abutting engagement with each other for completing an electrical circuit from wheel to wheel irrespective of the relative rotation of said wheels and their associated stub axles.

5. In a railway running gear, a hollow axle, a wheel rigidly mounted adjacent one end of the axle and another wheel mounted rigidly on a sleeve rotatably mounted adjacent the other end of the axle, and a pair of electrical contacts mounted within the hollow axle, one electrically connected to the hollow axle and the other electrically connected to said sleeve, the contacts being biased into abutting engagement and completing an electrical circuit from wheel to wheel irrespective of their relative rotation.

6. In a railway running gear, a hollow axle, a wheel rigidly mounted adjacent one end of the axle, and another wheel rigidly mounted on a sleeve rotatably mounted adjacent the other end of the axle, a closure for the end of said sleeve, an oil seal between said closure and the adjacent end of the axle, said closure and the hollow axle forming a closed chamber housing a pair of electrical contacts, one of said contacts being mounted concentrically of the axle and having an unbroken electrical connection therewith and the other concentrically of the sleeve and having an unbroken electrical connection therewith, and means biasing said contacts into abutting engagement to complete an electrical circuit from wheel to wheel irrespective of their relative rotation.

7. In a railway running gear, a sectional axle housing including two end sections and a separate central section connecting the ends sections, stub axles fixedly carrying wheels and rotatably mounted in said end sections but spaced from each other at their inner ends, the end and central sections of said axle housing forming a chamber between the inner ends of the stub axles, a pair of electrical contacts housed by said chamber, one of said contacts being electrically connected to one of said stub axles and the other contact being electrically connected to the other of said stub axles, and means biasing said contacts into abutting engagement to complete an electrical circuit from wheel to wheel irrespective of their relative rotation.

MICHAEL WATTER.

REFERENCES CITED

The following references are of record in the file of this patent:

UNITED STATES PATENTS

| Number | Name | Date |
|---|---|---|
| 1,493,416 | Angstrom | May 6, 1924 |
| 1,742,826 | Sanders et al. | Jan. 7, 1930 |